US008868026B2

(12) United States Patent
Dhomeja

(10) Patent No.: US 8,868,026 B2
(45) Date of Patent: Oct. 21, 2014

(54) SENDING BCCH MODIFICATION INFO/ETWS INFORMATION TO UES IN ENHANCED CELL PCH IN ONE DRX CYCLE

(75) Inventor: Sheyam Lal Dhomeja, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/599,704

(22) Filed: Aug. 30, 2012

(65) Prior Publication Data
US 2014/0065998 A1 Mar. 6, 2014

(51) Int. Cl.
H04W 4/22 (2009.01)
(52) U.S. Cl.
USPC .................................. 455/404.1; 455/458
(58) Field of Classification Search
CPC ....................................................... H04W 4/22
USPC ......... 455/404.1, 412.2, 414.1, 458, 466, 558
See application file for complete search history.

(56) References Cited

U.S. PATENT DOCUMENTS

| 8,266,491 | B2 * | 9/2012 | Lee et al. ...................... 714/749 |
| 8,339,249 | B2 * | 12/2012 | Kitazoe ....................... 340/311.2 |
| 8,422,418 | B2 * | 4/2013 | Gou et al. ...................... 370/312 |
| 8,472,355 | B2 * | 6/2013 | Zhu ............................... 370/270 |
| 2009/0239498 | A1 * | 9/2009 | Lee et al. .................... 455/404.1 |
| 2011/0002281 | A1 * | 1/2011 | Terry et al. ..................... 370/329 |
| 2011/0070862 | A1 * | 3/2011 | Chen ........................... 455/404.1 |
| 2011/0136465 | A1 * | 6/2011 | Ekemark et al. ............. 455/404.1 |
| 2012/0238208 | A1 * | 9/2012 | Bienas et al. ................. 455/41.2 |
| 2012/0281565 | A1 * | 11/2012 | Sauer ............................. 370/252 |
| 2012/0329462 | A1 * | 12/2012 | Pica et al. ...................... 455/437 |
| 2013/0084845 | A1 * | 4/2013 | Kimura et al. ................ 455/418 |
| 2013/0203450 | A1 * | 8/2013 | Mochizuki et al. ........... 455/458 |

OTHER PUBLICATIONS

3GPP TS 25.433 V10.6.0, Technical Specification, 3rd Generation Partnership Project; Technical Specification Group Radio Access Network; UTRAN Iub Interface Node B Application Part (NBAP) signalling (Release 10), Jun. 2012, 1284 pages.
3GPP TS 25.433 V11.1.0, Technical Specification, 3rd Generation Partnership Project; Technical Specification Group Radio Access Network; UTRAN Iub Interface Node B Application Part (NBAP) signalling (Release 11), Jun. 2012, 1292 pages.

* cited by examiner

*Primary Examiner* — Sharad Rampuria
*Assistant Examiner* — Khawar Iqbal
(74) *Attorney, Agent, or Firm* — Squire Patton Boggs (US) LLP

(57) ABSTRACT

Communication systems, such as reliant on the third generation partnership project, may benefit from a reduced number of discontinuous reception cycles needed to receive emergency messages. More specifically, such communication systems may benefit from methods and systems for sending broadcast control channel modification info such as earthquake and tsunami warning system information to user equipment in enhanced cell paging channel in one discontinuous reception cycle.

18 Claims, 3 Drawing Sheets

SENDING BCCH MODIFICATION INFO/ETWS INFORMATION TO UES IN ENHANCED CELL PCH IN ONE DRX CYCLE

BACKGROUND

1. Field

Communication systems, such as reliant on the third generation partnership project, may benefit from a reduced number of discontinuous reception cycles needed to receive emergency messages. More specifically, such communication systems may benefit from methods and systems for sending broadcast control channel modification info/earthquake and tsunami warning system information to user equipment in enhanced cell paging channel in one discontinuous reception cycle.

2. Description of the Related Art

According to third generation partnership project (3GPP) prior to release 7 (Rel-7), a user equipment (UE) in idle mode, and in universal terrestrial radio access (UTRA) registration area (URA)/cell paging channel (PCH) state can be informed about broadcast type of information. This broadcast type of information include, for example, broadcast control channel (BCCH) modification info information element (IE) through PAGING TYPE 1, paging control channel (PCCH)/PCH/ secondary-common control physical channel (S-CCPCH). In order for all user equipment to get this information, radio resource control (RRC) message PAGING TYPE 1 is repeated over 1 discontinuous reception (DRX) cycle.

UEs in the cell forward access channel (FACH) receive BCCH modification info through RRC message SYSTEM INFORMATION CHANGE INDICATION (BCCH/FACH/S-CCPCH).

In 3GPP Rel-7, enhanced cell FACH, and enhanced Cell PCH are introduced, and the BCCH modification info IE is sent to UEs having high speed downlink shared channel (HS-DSCH) reception capabilities in cell FACH, and in cell PCH, through different transport channel, HS-DSCH, and physical channel, high speed physical downlink shared channel (HS-PDSCH).

This increases the combinations in which the BCCH modification info is sent to UEs in cell, due to cells having different configurations, such as enhanced Cell FACH and enhanced Cell PCH.

For example, BCCH modification info is sent in RRC message PAGING TYPE 1 through PCCH/HS-DSCH/HS-PDSCH to those UEs, which have HS-DSCH reception capability in URA PCH state, and in Cell PCH state, but have not been assigned dedicated high speed downlink packet access (HSDPA) radio network temporary identifier (H-RNTI).

The RRC message PAGING TYPE 1 is repeated over one DRX cycle so that all the UEs having no dedicated H-RNTI receive this message.

The UEs, that have HS-DSCH reception capability in Cell PCH states and are assigned dedicated H-RNTI, receive BCCH modification info IE in RRC message SYSTEM INFORMATION CHANGE INDICATION.

This RRC message is also repeated for one DRX cycle, so that all the UEs having dedicated H-RNTI receive the message. Thus, it can take two DRX cycles to get the BCCH modification info IE to all the UEs that have HS-DSCH reception capability in URA PCH and in Cell PCH, because SYSTEM INFORMATION CHANGE INDICATION and PAGING TYPE 1 are not sent together on HS-DSCH.

Furthermore, an earthquake and tsunami warning service (ETWS) information IE is introduced in 3GPP release 8, and this IE is sent to UEs in the same RRC messages that are used to carry BCCH Modification info IE. This means that it will take two DRX cycles to get ETWS Information IE to all the UEs that have HS-DSCH reception capability in URA PCH and in Cell PCH. ETWS information is emergency type of broadcast, which has the highest priority, and 3GPP has set a time requirement so that ETWS information should reach to UEs in notification area, from private land mobile network (PLMN) in 4 seconds. This path can include cell broadcast center, to radio network controller/base transceiver station to user equipment.

Whenever earthquake and Tsunami warning needs to be sent to UEs in the notification area (notification area could cover one cell or more than one cells), UTRAN is required to generate and process multiple messages, as captured in Table 1, simultaneously, to meet the time requirement of 4 seconds. As can be seen from Table 1, there are so many messages which need to be processed by RNC, and Node B at the same time in order to meet the timing requirement. In this situation of urgency, when ETWS Information IE is sent to all UEs in cell (neither enhanced cell FACH, nor enhanced Cell PCH configured in the cell) through RRC message PAGING TYPE 1 (PCCH/PCH/S-CCPCH) over 1 DRX cycle.

On other hand, it takes 2 DRX cycles to transmit the ETWS Information IE to all the UEs in URA/Cell PCH having HS-DSCH reception capability, as explained above. This leaves total time budget of 2.72 seconds [4 seconds−1.28 seconds (assuming DRX cycle default=64 frames=640 ms=0.64 seconds)=2.72 seconds] to process ETWS information from CBC→RNC, to process 128 frames (2×64) at RNC, to transport 128 frames from RNC to node B or base transceiver station (BTS), to process 128 frames at node B/BTS, and UEs receive ETWS information, and either display the warning on the screen, vibrate the UE, or make a distinct sound.

The following Table 1 consists of messages that are sent from the RNC during the broadcast of ETWS related information to all the UEs in the notification area. Thus, Table 1 shows the complexity of this emergency procedure.

TABLE 1

| | UEs having HS-DSCH reception capability in Cell FACH & URA/Cell PCH (Yes/No) | UE RRC State | RRC Message | RRC Message (sent/repeated) | Logical channel/ Transport Channel/ Physical Channel | Iub Common Transport Channel Data Frame |
|---|---|---|---|---|---|---|
| BCCH Modification info IE/ | No | Idle mode, Cell PCH, URA PCH | PAGING TYPE 1 | Repeated over 1 DRX Cycle | PCCH/PCH/ S-CCPCH | PCH DATA FRAME |
| ETWS Information IE | Yes | URA/Cell PCH (no dedicated H-RNTI assigned to UE.) | PAGING TYPE 1 | Repeated over 1 DRX CYCLE | PCCH/HS-DSCH/HS-PDSCH | HS-DSCH FRAME TYPE 3 |
| | Yes | Cell PCH (dedicated H-RNTI | SYSTEM INFORMATION | Repeated over 1 DRX CYCLE | BCCH/HS-DSCH/HS- | HS-DSCH FRAME TYPE |

TABLE 1-continued

| UEs having HS-DSCH reception capability in Cell FACH & URA/Cell PCH (Yes/No) | UE RRC State | RRC Message | RRC Message (sent/repeated) | Logical channel/ Transport Channel/ Physical Channel | Iub Common Transport Channel Data Frame |
|---|---|---|---|---|---|
| | assigned to UE.) | CHANGE INDICATION | | PDSCH | 3 |
| No. | Cell FACH | SYSTEM INFORMATION CHANGE INDICATION | Sent at least ONCE | BCCH/FACH/ S-SCCPCH | FACH DATA FRAME |
| Yes | Cell FACH (with or without dedicated H-RTI) | SYSTEM INFORMATION CHANGE INDICATION | Sent at least ONCE/DRX Cycle (if enhanced UE DRX in Cell FACH feature is configured in the cell) | BCCH/HS-DSCH/HS-PDSCH | HS-DSCH FRAME TYPE 2 |

Further to the above, the UE may receive the ETWS PRIMARY NOTIFICATION WITH SECURITY message via dedicated control channel (DCCH), when the UE is in a state where it is configured to receive DCCH.

SUMMARY

According to certain embodiments, a method includes preparing an emergency message. The method also includes sending the emergency message to all user equipments in a set of user equipments. The sending includes sending a modification control message in parallel with a paging control message.

In certain embodiments, an apparatus includes at least one processor and at least one memory including computer program code. The at least one memory and the computer program code are configured to, with the at least one processor, cause the apparatus at least to prepare an emergency message. The at least one memory and the computer program code are also configured to, with the at least one processor, cause the apparatus at least to send the emergency message to all user equipments in a set of user equipments by sending a modification control message in parallel with a paging control message.

An apparatus, according to certain embodiments, includes preparing means for preparing an emergency message. The apparatus also includes sending means for sending the emergency message to all user equipments in a set of user equipments. The sending includes sending a modification control message in parallel with a paging control message.

A non-transitory computer-readable medium is, in certain embodiments, encoded with instructions that, when executed in hardware, perform a process. The process includes preparing an emergency message. The process also includes sending the emergency message to all user equipments in a set of user equipments. The sending includes sending a modification control message in parallel with a paging control message.

BRIEF DESCRIPTION OF THE DRAWINGS

For proper understanding of the invention, reference should be made to the accompanying drawings, wherein.

DETAILED DESCRIPTION

Figure 1:
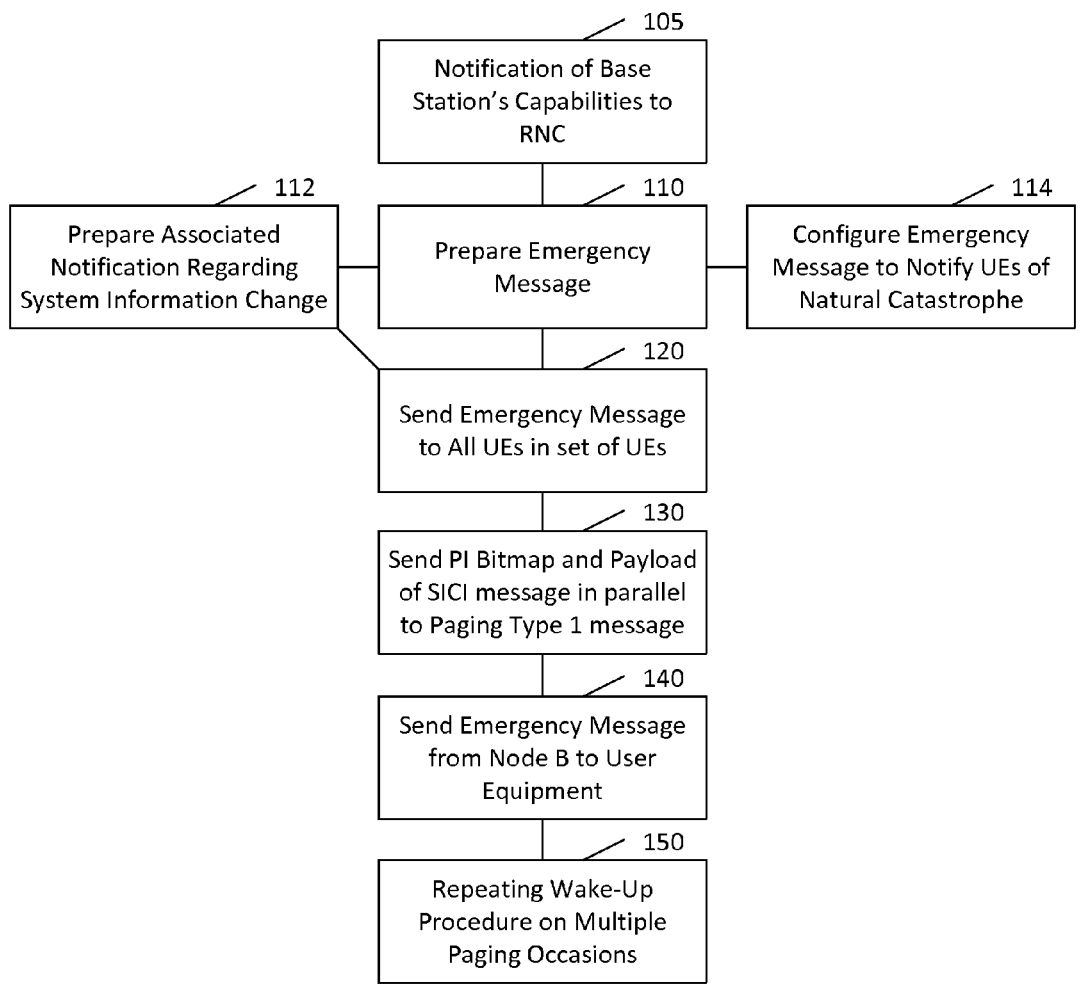
FIG. 1 illustrates a method according to certain embodiments.

In certain embodiments, earthquake and tsunami warning system (ETWS) information is transmitted to UEs having high speed physical downlink shared channel (HS-PDSCH) reception capability in universal terrestrial radio access (UTRA) registration area (URA)/cell paging channel (PCH) in one discontinuous reception (DRX) cycle rather than two DRX cycles. If one DRX Cycle=640 ms (0.64 seconds), then certain embodiments can save, at the radio network controller and node B, 0.64 seconds of air interface time plus processing time. The UTRA network (UTRAN) may use this saving to avoid dropping frames, if such loss of frames happens due to load or congestion created in the network due to processing of this emergency information. If the notification area involves more than one cell, then this saving could significantly contribute to easing the processing load and congestion in the network. Thus, certain embodiments may provide saving in time and/or in processing at a radio network controller (RNC) and/or Node B.

In general, certain embodiments can include sending the emergency message, for example an ETWS message, to all UEs, having HS-DSCH reception capability in URA/Cell PCH, in one DRX cycle. Here "all UEs" can refer to all UEs in a large area, such a many cells, or all the UEs in a smaller area, such as a single cell. Other sets can also be made, such as all UEs below a certain altitude, or all UEs that are identified as being indoors or in a particular building or category of building. Other sets of UEs can be made. This emergency message can be sent by use of radio resource control (RRC) messages SYSTEM INFORMATION CHANGE INDICATION (SICI) and PAGING TYPE 1, which are transmitted in parallel from a Node B to UEs in the cell. This may involve an RNC, or other frame protocol entity, sending the paging indicator (PI) bitmap and payload of SYSTEM INFORMATION CHANGE INDICATION, and PAGING TYPE 1 in 2 HS-DSCH Frame Type 3 in parallel, to node B.

More specifically, the base transceiver station (BTS) or node B can schedule paging indicator channel (PICH) with all PI bits set to '1' in paging occasion, and can transmit broadcast control channel (BCCH) SYSTEM INFORMATION CHANGE INDICATION, as specified in third generation partnership project (3GPP) technical specification (TS) 25.214. Moreover, at the same time in the air the node B can transmit paging control channel (PCCH), PAGING TYPE 1, as specified in 3GPP TS 25.214. For the UEs that have HS-DSCH reception capability in URA/Cell PCH, this is transparent. 3GPP TS 25.214 is hereby incorporated herein by reference in its entirety.

UEs having dedicated H-RNTI in Cell PCH, upon detecting the page, monitor high speed shared control channel (HS-SCCH) codes, and decode the HS-PDSCH carrying SYSTEM INFORMATION CHANGE INDICATION message payload. UEs without dedicated H-RNTI in Cell PCH, and UEs in URA PCH, upon detecting page, decode HS-PDSCH carrying PAGING TYPE 1 payload with fixed layer 1 information, which is already known to UEs through system information and 3GPP default values.

A frame protocol (FP) entity at the RNC can prepare paging PDUs for SYSTEM INFORMATION CHANGE INDICATION, and PAGING TYPE 1 messages. For system information change indication (SICI), the fields of HS-DSCH Frame Type 3 along with payload may be set as follows: paging indicator (PI) is set to 1, connection frame number (CFN) is set to XX (for example), in PI bitmap all PI bits are set to '1', HSPDA radio network temporary identifier (H-RNTI) indicator (HI) is set to 1, HSPDA radio network temporary identifier (H-RNTI) is set to BCCH Specific H-RNTI, logical channel ID is set to binary 1111, and other fields in HS-DSCH Frame Type 3 are set with required values. The value of XX for the CFN may be set arbitrarily, or based on factors determined by the FP entity.

For PAGING TYPE 1 (PT1), the fields of HS-DSCH Frame Type 3 along with payload may be set as follows: PI is set to 1, CFN is set to XX (same as in SICI), in PI bitmap all PI bits are set to '1', HI is set to 0, no H-RNTI, logical channel ID is set to binary 1111, and other fields in HS-DSCH Frame Type 3 are set with required values.

The FP entity can send both HS-DSCH Frame type 3 messages—one carrying PICH and BCCH payload, and another carrying PICH and PCCH payload—in parallel to the node B.

At the node B, both of the HS-DSCH Frame type 3 messages are received at the same time. Here, receiving the messages at the same time does not require receiving the messages at exactly identical times, but can instead refer to receiving both within the same connection frame. By checking the fields of HS-DSCH frame type 3, with HI=1, H-RNTI=BCCH specific H-RNTI, PI=1, the node B can deduce that this HS-DSCH frame type 3 carrying PICH and BCCH payload is of an SICI intended for UEs in enhanced Cell PCH having dedicated H-RNTI.

By checking the fields of HS-DSCH frame type 3, with HI=0, No H-RNTI, PI=1, and PI bitmap with all PI set to '1' node B deduces that this HS-DSCH frame type 3 carrying PICH, and PCCH payload is of PT1 (which includes broadcast information BCCH modification info/ETWS Information IE) for UEs in enhanced Cell PCH having no dedicated H-RNTI, and for UEs in URA PCH (in enhanced PCH).

The node B can transmits PI (with all PI set to '1') in an HSDPA associated PICH. In certain embodiments, only one paging medium access control (MAC) flow is configured in the cell.

For SYSTEM INFORMATION CHANGE INDICATION, the node B transmits first Indexed HS-SCCH containing BCCH specific H-RNTI, and other layer 1 information, to UEs having dedicated H-RNT in Cell PCH. Layer 1 information (including HS-PDSCH Channelization) used to decode HS-PDSCH, is decided by the node B. The node B transmits HS-PDSCH in a subframe, which is associated with HS-SCCH subframe. The node B can choose an HS-PDSCH channelization code that is different from that which is used in PAGING TYPE1 (PCCH mapped to HS-DSCH/HS-PDSCH) for UEs having no dedicated H-RNTI.

For PAGING TYPE 1, there is no requirement that HS-SCCH be sent to UEs in URA PCH and UEs having no dedicated H-RNTI in the Cell PCH. Instead, the node B can transmit PCCH mapped to HS-DSCH in a first subframe of HS-PDSCH, and the node B can use an HS-PDSCH channelization code that has been broadcasted through system information in SIB 5/5bis. UEs in URA PCH, and UEs having no dedicated H-RNTI, know layer 1 information to decode the HS-PDSCH channelization code by reading SIB 5/5bis, and through 3GPP specification default settings.

Whether in URA PCH or in Cell PCH with or without dedicated H-RNTI, UEs wake up in their paging occasion and detect the page. UEs in Cell PCH, having dedicated H-RNTI, upon detecting the page, monitor HS-SCCH codes. First, these UEs monitor a first indexed HS-SCCH code for BCCH specific H-RNTI. These UEs detect the BCCH specific H-RNTI in the first indexed HS-SCCH code, and obtain layer 1 information through HS-SCCH to decode HS-PDSCH correctly.

In this way, UEs having dedicated H-RNTI in Cell PCH can receive a SYSTEM INFORMATION CHANGE INDICATION message.

On the other hand, UEs in URA PCH and in Cell PCH having no dedicated H-RNTI, upon detecting page are not required to monitor HS-SCCH codes. The UEs may know layer 1 information through SIB5/5bis, and fixed information through 3GPP. The fixed information can include, for example, modulation type, redundancy versions, etc. The UES can apply this known fixed information to decode HS-PDSCH correctly. In this way, UEs in URA PCH, and having no dedicated H-RNTI, receive PAGING TYPE 1 message.

The above procedure is described for one paging occasion, and all the UEs waking up in this paging occasion can receive the RRC message. UEs having dedicated H-RNTI in Cell PCH can receive SICI, and UEs in URA PCH, as well as UEs in Cell PCH without dedicated H-RNTI, can receive PT1.

This procedure can be repeated for one DRX cycle so that all the UEs in other paging occasions also receive RRC message intended for them.

Accordingly certain embodiments broadcast a particular type of information, such as BCCH modification info IE and/or ETWS information IE, or any other such information to be broadcasted to UEs in enhanced CELL PCH. Moreover, in certain embodiments such information can be sent over one DRX cycle, as compared to prior approaches that required two DRX cycles.

Accordingly, certain embodiments may bring benefit to both UTRAN and UE. After sending broadcast type of information in one DRX cycle to UEs in the enhanced Cell PCH, the RNC and node B may utilize the saved time and processing power to prepare other messages to be sent to UEs in the cell with different configuration. These messages may include sending Earthquake and Tsunami warnings to the other UEs in the notification area.

With a one DRX cycle approach, as illustrated by the above examples, UEs may receive broadcasted information, such as ETWS Information, at least 0.64 seconds earlier, depending upon setting of the DRX Cycle length, compared to a two DRX cycle approach. Besides this, the UEs in enhanced Cell PCH may only have to receive a single page and attempt to decode HS-PDSCH, whenever broadcast information such as BCCH modification info and ETWS information is sent to UEs. By comparison, in a two DRX cycle approach, UEs in enhanced Cell PCH have to receive two pages during two DRX cycle, and attempt to decode HS-PDSCH in both DRX cycles.

Thus, in certain embodiment whenever there is change in the system information or there is an earthquake and tsunami warning, then UEs in Cell FACH, and in URA/Cell PCH can be informed through RRC messages SYSTEM INFORMATION CHANGE INDICATION, and PAGING TYPE 1, respectively. If a cell is configured with enhanced Cell PCH for high speed Cell PCH, then UEs in URA/Cell PCH may be informed about the system information change or ETWS information through RRC message SYSTEM INFORMATION CHANGE INDICATION and PAGING TYPE 1.

In certain embodiments, an RNC may send two HS-DSCH frame type 3 messages in parallel to Node B. The Node B may be aware that it has to receive two HS-DSCH Frame type 3 messages, if sent from RNC. Also, RNC can know whether the Node B is capable of receiving two HS-DSCH frame type 3 at the same time. This may involve the use of one IE in 'HS-DSCH Paging System Information' IE, which was not previously included in 3GPP TS 25.433, which is hereby incorporated herein by reference in its entirety. The name of the new IE can be, for example, 'allowed number of HS-DSCH Frame type 3 per CFN' although other names are permitted. On the other hand, the Node B may let the RNC know the Node B's capability, with respect to receiving two HS-DSCH Frame type 3 message for a same CFN, by responding to 'allowed number of HS-DSCH Frame Type 3 per CFN' through 'HS-DSCH Paging System Information Response' IE.

According to certain embodiments, an RRC message, system information change indication, can include two information elements: BCCH modification information and ETWS information. Moreover, a second RRC message, PAGING TYPE 1, can include common information through two information elements: BCCH modification info and ETWS information.

The system information change indication and paging type 1 messages can be sent in parallel to all the UEs in one DRX cycle. Some UEs can obtain the common information through the system information change indication message according to each UE's own capability, and other UEs can receive the common information through a paging type 1 message according to each UE's own capability.

The RNC can send both system information change indication message, and paging type 1 in parallel to the node B. Moreover, the node B may receive both messages, namely system information change indication and paging type 1 simultaneously.

The node B can then send/transmit both messages to the UEs in parallel in one DRX cycle.

In such an embodiment, all the UEs receive common information in one DRX cycle, and UEs are not paged for two DRX cycles to check the common information. Thus, UEs may save their battery by not checking common information in a second DRX cycle.

FIG. 1 illustrates a method according to certain embodiments. The method of FIG. 1 can be performed by a network element, such a radio network controller, frame entity, or base station, such as a Node B. Alternatively, the method can be performed by a variety of network elements working together.

As shown in FIG. 1, the method can include, at 110, preparing an emergency message. The method can include, at 112, preparing an associated notification regarding change in system information to notify UEs about a change in system information. The method can also include, at 114, configuring the message to notify UEs about an earthquake and tsunami warning or other natural catastrophe warning, which can itself be considered the emergency message. Thus, certain embodiments include preparing both the emergency message and an associated notification regarding change in system information. Broadly, a reference to the emergency message can encompass both the emergency message itself and the associated notification regarding change in system information, as these may be sent at the same time.

The method can also include, at 120, sending the emergency message to all user equipment in a set of user equipment. This sending can be performed directly in the case of a base station, such as a Node B, or indirectly in the case of an RNC. The sending can include sending a system information change indication message in parallel with a paging type 1 message.

The emergency message can be a natural catastrophe warning messages, such as an earthquake and tsunami warning message. Other kinds of natural catastrophe warning messages, such as messages of the U.S. National Weather Service, including flash flood, severe storm, tornado or hurricane watches, warnings, and/or advisories can also be considered within the category of natural catastrophe warning messages. The set of user equipment can be all user equipment in a network in a geographic area. The set can also be defined in terms of user equipment capability to receive signals, such as pagings, used to communicate the message. For example, all the user equipment may have high speed downlink shared channel reception capability in universal terrestrial radio access registration area/cell paging channel. More specifically, all the user equipment may have high speed downlink shared channel reception capability in UTRAN registration area paging channel and cell paging channel state.

The sending can include sending the emergency message to all the user equipment in one discontinuous reception period. Specifically, the emergency method can be sent to all the user equipment of the set within one discontinuous reception period.

The sending can include, at 140, sending the emergency message from a node B to a user equipment. The sending can also include, at 130, a radio network controller sending a PI bitmap and a payload of the system information change indication message, and the paging type 1 message in parallel in high speed downlink shared channel frame type 3. The sending the system information change indication message in parallel with the paging type 1 message can include sending the system information change indication message in a same connection frame as the paging type 1 message.

Sending the emergency message to all user equipment can include, at 150, repeating a wake-up procedure on multiple paging occasions within a single discontinuous reception period.

The method can also include, at 105, notifying a base station's capability to receive the system information change indication message in parallel with the paging type 1 message and/or receiving a notification of the base station's capability to receive the system information change indication message in parallel with the paging type 1 message. This notification can serve as the basis for the RNC determining to use the remaining steps of the method.

Figure 2:
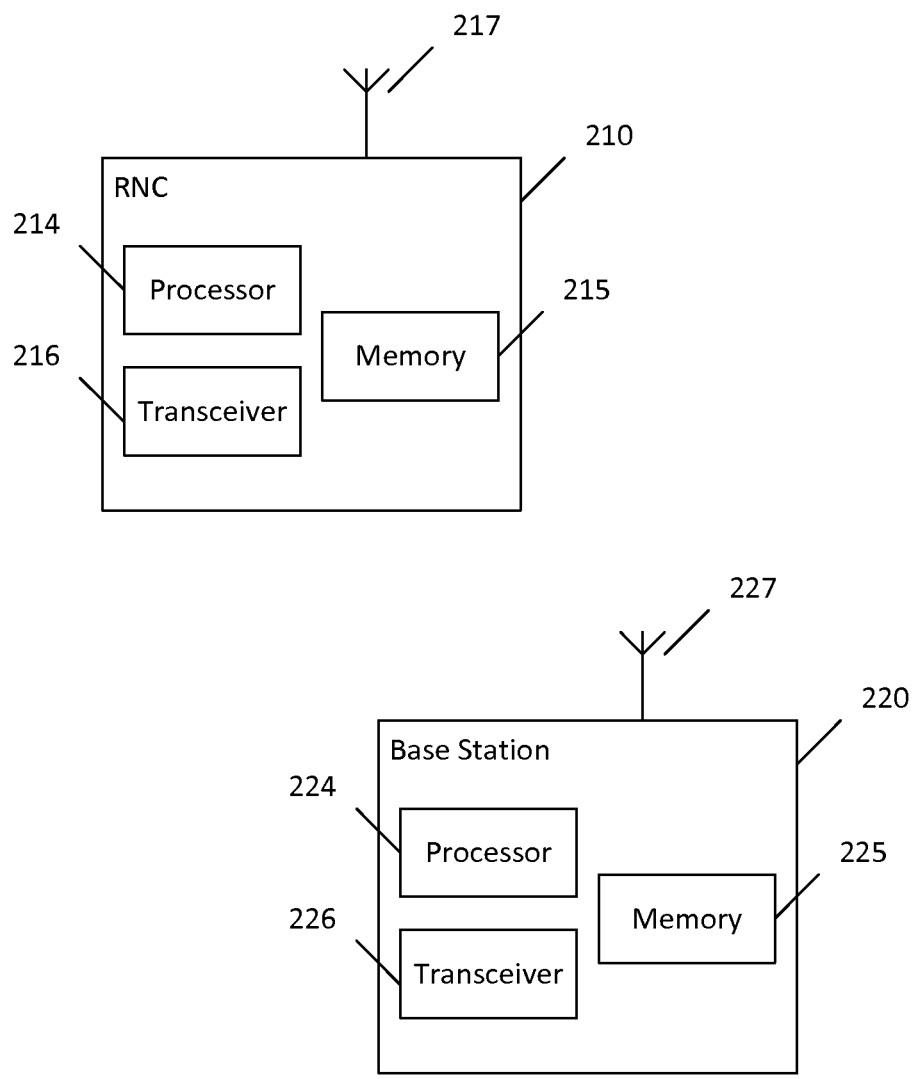
FIG. 2 illustrates a system according to certain embodiments.

FIG. 2 illustrates a system according to certain embodiments of the invention. In one embodiment, a system may include several devices, such as, for example, RNC 210 and base station 220. The system may include more than one base station 220 and more than one RNC 210, although only one of each is shown for the purposes of illustration. Each of these devices may include at least one processor, respectively indicated as 214 and 224. At least one memory may be provided in each device, and indicated as 215 and 225, respectively. The memory may include computer program instructions or computer code contained therein. One or more transceiver 216 and 226 may be provided, and each device may also include an antenna, respectively illustrated as 217 and 227.

Although only one antenna each is shown, many antennas and multiple antenna elements may be provided to each of the devices. Other configurations of these devices, for example, may be provided. For example, RNC 210 and base station 220 may be additionally configured for wired communication, in addition to wireless communication, and in such a case antennas 217 and 227 may illustrate any form of communication hardware, without being limited to merely an antenna. In the case of the RNC 210, the device may be solely configured for wired communication.

Transceivers 216 and 226 may each, independently, be a transmitter, a receiver, or both a transmitter and a receiver, or a unit or device that may be configured both for transmission and reception.

Processors 214 and 224 may be embodied by any computational or data processing device, such as a central processing unit (CPU), application specific integrated circuit (ASIC), or comparable device. The processors may be implemented as a single controller, or a plurality of controllers or processors.

Memories 215 and 225 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory, which may be processed by the processors, can be any suitable form of computer program code, for example, a compiled or interpreted computer program written in any suitable programming language.

The memory and the computer program instructions may be configured, with the processor for the particular device, to cause a hardware apparatus such as RNC 210 and base station 220, to perform any of the processes described above (see, for example, FIG. 1). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 2 illustrates a system including an RNC 210 and a base station 220, embodiments of the invention may be applicable to other configurations, and configurations involving additional elements, as illustrated and discussed herein. For example, multiple user equipment devices, multiple base stations, and multiple RNCs may be present, or other nodes providing similar functionality, such as relays which may receive data from a user equipment and forward the data to a base station and may implement both functionality of the base station and functionality of the user equipment.

Figure 3:
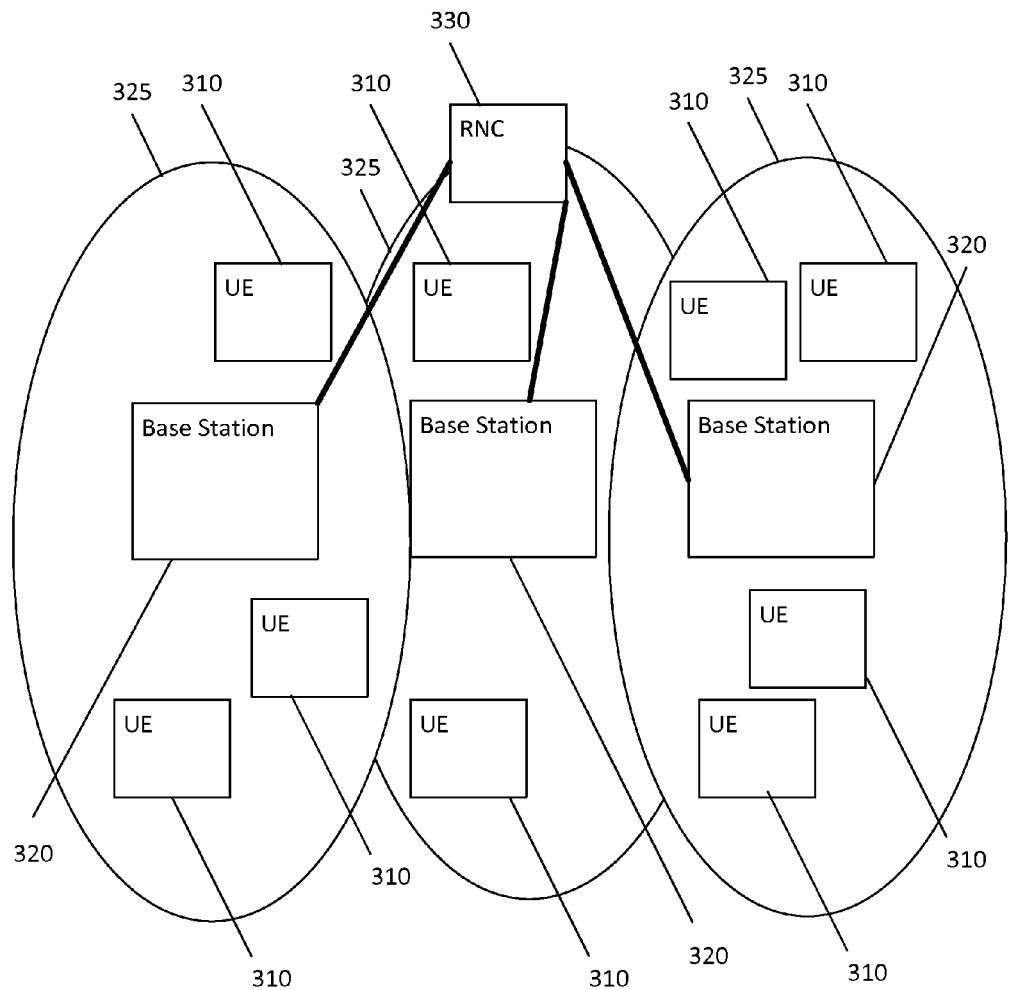
FIG. 3 illustrates a network according to certain embodiments.

FIG. 3 illustrates a network according to certain embodiments. As shown in FIG. 3, the network may include core network elements, such as an RNC 330, edge network elements, such as base stations 320, and user equipment 310, which may be connected to the core network via the access network. Each base station 320 may have within its area of coverage 325, more than one of the user equipment 310. Each base station 320 can be connected to the RNC 330.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

BCCH Broadcast Control CHannel
BTS Base Transceiver Station
CBC Cell Broadcast Centre
CFN Connection Frame Number
DCCH Dedicated Control Channel
DRX Discontinuous Reception
ETWS Earthquake & Tsunami Warning System
FACH Forward Access Channel
FP Frame Protocol
HI H-RNTI Indicator
H-RNTI HSDPA-Radio Network Temporary Identifier
HS-DSCH High Speed-Dedicated Shared Channel
HS-PDSCH High Speed-Physical Dedicated Shared Channel
HS-SCCH High Speed-Shared Control Channel
IE Information Element
PCCH Paging Control Channel
PCH Paging Channel
PDU Protocol Data Unit
PI Paging Indicator
PICH Paging Indicator Channel
RNC Radio Network Controller
RRC Radio Resource Control
S-CCPCH Secondary-Common Control Physical Channel
UE User Equipment
URA UTRA Registration Area
UTRAN Universal Terrestrial Radio Access Network

What is claimed is:

1. A method, comprising:
preparing an emergency message; and
sending the emergency message to all user equipments in a set of user equipments, wherein the sending comprises sending a modification control message in parallel with a paging control message, and
wherein the sending comprises a radio network controller sending a paging indicator bitmap and a payload of a system information change indication message as the modification control message, and a paging type 1 message as the paging control message in parallel in an Iub frame protocol.

2. The method of claim 1, wherein the emergency message comprises a natural catastrophe warning message.

3. The method of claim 1, wherein the set of user equipment comprises all user equipment in a network in a geographic area.

4. The method of claim 1, wherein the sending comprises sending the emergency message to all the user equipment in one discontinuous reception cycle.

5. The method of claim 1, wherein all the user equipment have high speed downlink shared channel reception capability in universal terrestrial radio access network registration area paging channel and cell paging channel state.

6. The method of claim 1, wherein the sending comprises sending the emergency message from a node B to a user equipment.

7. The method of claim 1, wherein the sending the modification control message in parallel with the paging control message comprises sending the modification control message in a same connection frame as the paging control message.

8. The method of claim 1, wherein the sending the emergency message to all user equipment comprises repeating a wake-up procedure on multiple paging occasions within a single discontinuous reception period.

9. The method of claim 1, further comprising:
   notifying a base station's capability to receive the modification control message in parallel with the paging control message; or
   receiving a notification of the base station's capability to receive the modification control message in parallel with the paging control message.

10. An apparatus, comprising:
   at least one processor; and
   at least one memory including computer program code,
   wherein the at least one memory and the computer program code are configured to, with the at least one processor, cause the apparatus at least to
   prepare an emergency message; and
   send the emergency message to all user equipments in a set of user equipments by sending a modification control message in parallel with a paging control message,
   wherein the at least one memory and the computer program code are configured to, with the at least one processor, cause the apparatus at least to send the emergency message by a radio network controller sending a paging indicator bitmap and a payload of a system information change indication message as the modification control message, and a paging type 1 message as the paging control message in parallel in an Iub frame protocol.

11. The apparatus of claim 10, wherein the emergency message comprises a natural catastrophe warning message.

12. The apparatus of claim 10, wherein the set of user equipment comprises all user equipment in a network in a geographic area.

13. The apparatus of claim 10, wherein the at least one memory and the computer program code are configured to, with the at least one processor, cause the apparatus at least to send the emergency message to all the user equipment in one discontinuous reception cycle.

14. The apparatus of claim 10, wherein all the user equipment have high speed downlink shared channel reception capability in universal terrestrial radio access network registration area paging channel and cell paging channel state.

15. The apparatus of claim 10, wherein the at least one memory and the computer program code are configured to, with the at least one processor, cause the apparatus at least to send the emergency message from a node B to a user equipment.

16. The apparatus of claim 10, wherein the at least one memory and the computer program code are configured to, with the at least one processor, cause the apparatus at least to send the modification control message in parallel with the paging control message by sending the modification control message in a same connection frame as the paging control message.

17. The apparatus of claim 10, wherein the at least one memory and the computer program code are configured to, with the at least one processor, cause the apparatus at least to send the emergency message to all user equipment by repeating a wake-up procedure on multiple paging occasions within a single discontinuous reception period.

18. The apparatus of claim 10, wherein the at least one memory and the computer program code are configured to, with the at least one processor, cause the apparatus at least to
   notify a base station's capability to receive the modification control message in parallel with the paging control message; or
   receive a notification of the base station's capability to receive the modification control message in parallel with the paging control message.

\* \* \* \* \*